US012700431B2

(12) United States Patent
Ito et al.

(10) Patent No.: US 12,700,431 B2
(45) Date of Patent: Aug. 4, 2026

(54) BASE PLATE, MOTOR, AND DISK DRIVE DEVICE

(71) Applicant: NIDEC CORPORATION, Kyoto (JP)

(72) Inventors: Michihiro Ito, Kyoto (JP); Takashi Mitsunari, Kyoto (JP); Kenta Miyoshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 229 days.

(21) Appl. No.: 18/751,327

(22) Filed: Jun. 23, 2024

(65) Prior Publication Data

US 2025/0006227 A1     Jan. 2, 2025

(30) Foreign Application Priority Data

Jun. 28, 2023    (JP) ................................. 2023-106231
Apr. 23, 2024    (JP) ................................. 2024-069885

(51) Int. Cl.
  *H02K 5/06*          (2006.01)
  *G11B 33/12*         (2006.01)
(52) U.S. Cl.
  CPC ............. *G11B 33/123* (2013.01); *H02K 5/06* (2013.01)
(58) Field of Classification Search
  CPC .............. H02K 5/1675; G11B 19/2045; G11B 19/2036; G11B 25/043; G11B 19/20; G11B 17/028; F16C 43/02; F16C 33/107
  See application file for complete search history.

(56) References Cited

U.S. PATENT DOCUMENTS 5,859,745 A *    1/1999  Elsing .................. G11B 25/043
                                                      360/99.18
11,574,653 B2    2/2023  Uehara et al.
2020/0258540 A1*  8/2020  Uehara ................ G11B 5/4833

FOREIGN PATENT DOCUMENTS

JP            2022190510        12/2022

* cited by examiner

*Primary Examiner* — Leda T Pham

(74) *Attorney, Agent, or Firm* — JCIPRNET

(57) ABSTRACT

A base plate includes a bottom wall and a peripheral wall. The peripheral wall extends from the bottom wall to an axially upper side. The bottom wall includes a screw hole recessed from a peripheral edge of a lower end surface of the bottom wall to the axially upper side. The screw hole includes an inclined part and a column body. The inclined part is defined to have an inner diameter that decreases from a lower end toward the axially upper side. The column body extends from an upper end of the inclined part to the axially upper side and is defined with a threaded part. In a cross section including a center line that passes through a center of the column body in an axial direction, the inclined part is inclined at an inclination angle of 25° or more and 35° or less with respect to the center line.

11 Claims, 16 Drawing Sheets

BASE PLATE, MOTOR, AND DISK DRIVE DEVICE

CROSS REFERENCE TO RELATED APPLICATIONS

The present invention claims priority under 35 U.S.C. § 119 to Japanese Application No. 2023-106231 filed on Jun. 28, 2023 and Japanese Application No. 2024-069885 filed on Apr. 23, 2024, the entire content of which is incorporated herein by reference.

FIELD OF THE INVENTION

The present disclosure relates to a base plate, a motor, a disk drive device, and a method for manufacturing the base plate.

BACKGROUND

A conventional base plate serving as a portion of a housing of a disk drive device is defined by a die-cast member including metal and includes a bottom wall. The bottom wall extends perpendicularly to a rotation axis of a disk extending in an up-down direction.

A screw hole for fixing a circuit board or the like with a screw is provided at a lower surface of the bottom wall. The screw hole is disposed at a peripheral edge of the bottom wall and extends from a lower end surface to an axially upper side. The screw hole is subjected to tapping (rolling) to define a threaded part to be screwed with the screw.

However, in the conventional base plate, a rolling tool may contact an inner circumferential surface at a lower end of the screw hole during tapping. At this time, a lower end of the defined threaded part may protrude from the inner circumferential surface at the lower end of the screw hole to generate a burr. Further, during tapping, a stress may be applied to a lower end circumferential edge of the screw hole, and the inner circumferential surface at the lower end of the screw hole may be partially raised to define a burr. In the case where a burr is defined protruding to the axially lower side compared to a lower end of the bottom wall, the base plate placed on a work table may rattle, and assembly precision of components mounted on the base plate may decrease.

SUMMARY

An exemplary base plate of the present disclosure is a portion of a housing of a disk drive device and is defined by a die-cast member including metal. The base plate includes a bottom wall and a peripheral wall. The bottom wall extends perpendicularly to a rotation axis of a disk extending in an up-down direction. The peripheral wall extends from a peripheral edge of the bottom wall to an axially upper side and surrounds a periphery of the bottom wall. The bottom wall includes a screw hole. The screw hole is recessed from a peripheral edge of a lower end surface of the bottom wall to the axially upper side. The screw hole includes an inclined part and a column body. The inclined part is defined to have an inner diameter that decreases from a lower end of the screw hole toward the axially upper side. The column body extends from an upper end of the inclined part to the axially upper side and is defined with a threaded part to be screwed with a screw. In a cross section including a center line that passes through a center of the column body and extends in an axial direction, the inclined part is inclined at an inclination angle of 25° or more and 35° or less with respect to the center line.

The above and other elements, features, steps, characteristics and advantages of the present disclosure will become more apparent from the following detailed description of the preferred embodiments with reference to the attached drawings.

DETAILED DESCRIPTION

An exemplary embodiment of the present disclosure will be described in detail with reference to the drawings. In the present specification, a direction parallel to a rotation axis J of a disk 50 will be referred to as an "axial direction", a direction orthogonal to the rotation axis J will be referred to as a "radial direction", and a direction along an arc centered on the rotation axis J will be referred to as a "circumferential direction". In the present application, shapes and positional relationships of each part will be described with the axial direction taken as an up-down direction and a cover 42 side as an upper side with respect to a base plate 41. However, the definition of the up-down direction is not intended to limit orientations during use of the base plate 41 and a disk drive device 1 according to the present disclosure.

Figure 1:
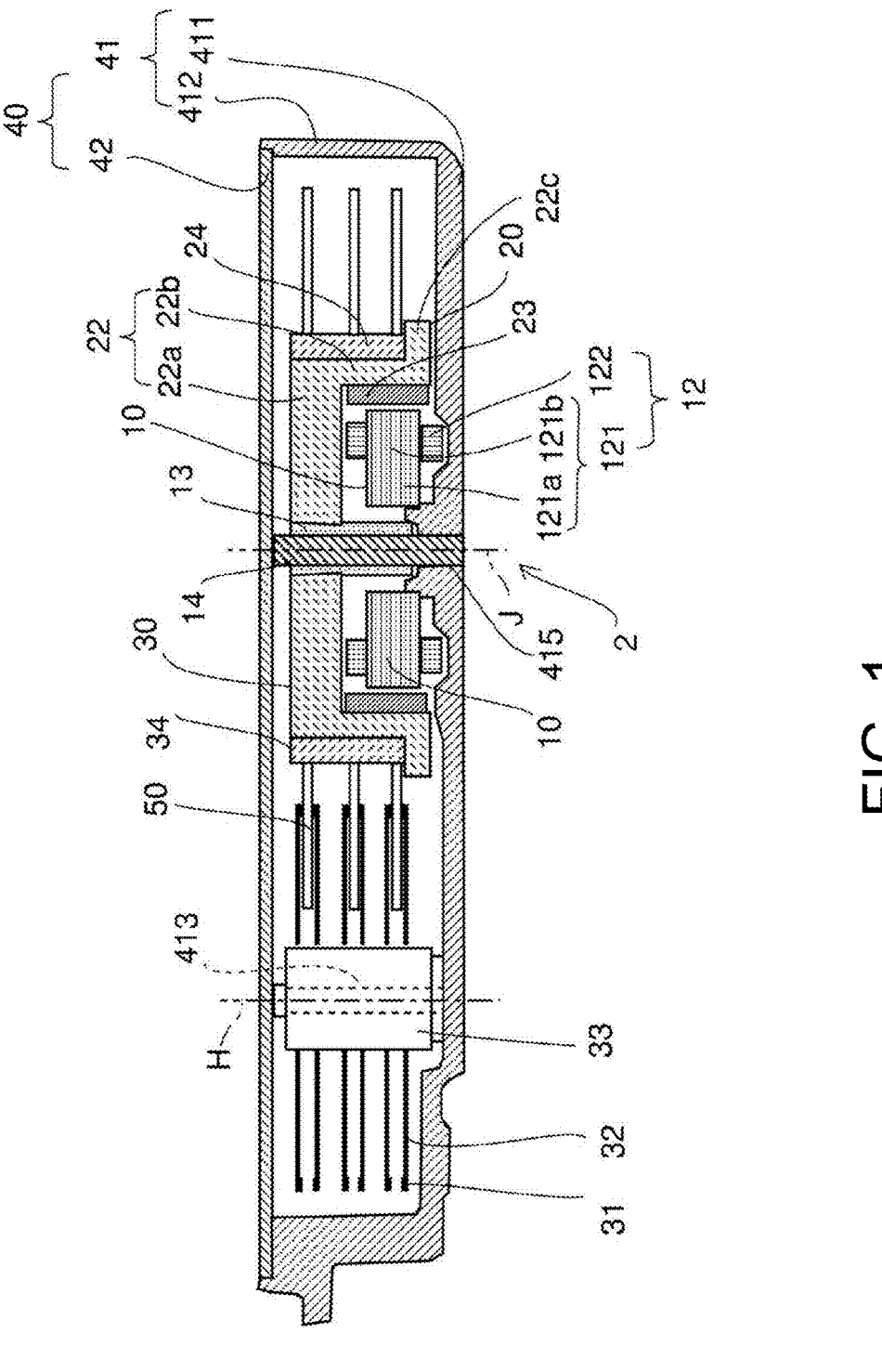
FIG. 1 is a longitudinal sectional view of a disk drive device according to an embodiment of the present disclosure.

A disk drive device 1 according to an exemplary embodiment of the present disclosure will be described. FIG. 1 is a longitudinal sectional view of a disk drive device 1 according to an embodiment of the present disclosure.

The disk drive device 1 is a hard disk drive. The disk drive device 1 includes a spindle motor (motor) 2, a disk 50, a head 31, an arm 32, a swing mechanism 33, a ramp 34, and a housing 40.

The housing 40 accommodates therein the spindle motor 2, the disk 50, the head 31, the arm 32, the swing mechanism 33, and the ramp 34.

A gas having a density lower than air is filled inside the housing 40. Thus, an air flow resistance inside the housing 40 is able to be reduced to reduce vibration of the disk 50. Specifically, a helium gas is filled. A hydrogen gas or the like may also be filled instead of the helium gas.

The housing 40 is defined by a die-cast member including an aluminum alloy as a material. The die-cast member may also include a metal other than an aluminum alloy.

The housing 40 includes a base plate 41 and a cover 42. That is, the base plate 41 is a portion of the housing 40 of the disk drive device 1 and is defined by a die-cast member including metal. The disk 50, the spindle motor 2, and the swing mechanism 33 are disposed on the base plate 41 inside the housing 40. An opening at an upper part of the base plate 41 is closed by the cover 42. The base plate 41 will be described in detail later.

The spindle motor 2 rotates the disk 50 around the rotation axis J while supporting the disk 50. That is, the disk 50 rotates by the spindle motor 2 around the rotation axis J extending in the up-down direction. The spindle motor 2 includes a stationary part 10 and a rotating part 20. The stationary part 10 is stationary with respect to the housing 40. The rotating part 20 is supported rotatably with respect to the stationary part 10.

The stationary part 10 includes a shaft 14 and a stator 12. A portion of the base plate 41 defines the stationary part 10. The base plate 41 is a portion of the spindle motor 2 and is also a portion of the housing 40. That is, the spindle motor 2 includes the base plate 41. The stator 12 and a bearing unit 13 are fixed to the base plate 41.

The shaft 14 is a columnar metal member extending in the axial direction. A lower end of the shaft 14 is fixed to the base plate 41.

The stator 12 includes a stator core 121, which is a magnetic body, and a plurality of coils 122. The stator core 121 includes an annular core back 121a and a plurality of teeth 121b. The core back 121a is disposed around the rotation axis J. The teeth 121b fixed to the base plate 41 protrude toward a radially outer side from an outer circumferential surface of the core back 121a and are disposed in the circumferential direction. The plurality of coils 122 are defined by conductive wires wound around the teeth 121b.

The bearing unit 13 is disposed at an outer circumference of the shaft 14 and rotatably supports a hub 22 on the rotating part 20 side. For example, the bearing unit 13 includes a fluid dynamic pressure bearing mechanism.

The rotating part 20 includes a hub 22 and a magnet 23. The hub 22 includes a top surface part 22a and a cylindrical surface part 22b. The top surface part 22a is disposed at an outer circumference of the bearing unit 13 and extends toward the radially outer side. The cylindrical surface part 22b is defined in a substantially cylindrical shape extending in the axial direction and includes a flange 22c extending to the radially outer side from a lower end. A plurality of disks 50 are arranged in the axial direction on an outer circumferential surface of the cylindrical surface part 22b.

The magnet 23 is fixed to an inner circumferential surface of the cylindrical surface part 22b and is disposed opposed to the radially outer side of the stator 12 by a predetermined distance away from each other. The magnet 23 has a substantially ring shape, and an N pole and an S pole are alternately magnetized in the circumferential direction on an inner circumferential surface of the magnet 23.

Upon supply of a drive current to the coils 122, a magnetic flux is generated in the plurality of teeth 121b. At this time, the magnetic flux interacts between the teeth 121b and the magnet 23, and a torque in the circumferential direction is generated. Accordingly, the rotating part 20 rotates around the rotation axis J with respect to the stationary part 10. The disk 50 supported by the hub 22 rotates around the rotation axis J together with the rotating part 20.

The disk 50 is a substantially disk-shaped information recording medium having a hole at a center. The disks 50 are mounted to the spindle motor 2 and are disposed in parallel with each other in the axial direction at an equal interval via a spacer 24.

The head 31 magnetically reads and writes information from and to the disk 50. The arm 32 is attached to a tip of a pivot post 413 via a bearing (not shown). The head 31 is disposed at a tip of the arm 32.

The pivot post 413 is defined in a substantially cylindrical shape protruding upward from an upper surface of a bottom wall 411 of the base plate 41 (to be described later) along a swing axis H. The pivot post 413 includes a post step part 413a (see FIG. 4). The post step part 413a is defined in a substantially annular shape protruding to the radially outer side from an outer circumferential surface of a root of the pivot post 413. A bottom of the post step part 413a is integrally defined with an upper part of the bottom wall 411. The root of the pivot post 413 is reinforced by the post step part 413a provided. Accordingly, the pivot post 413 is able to be prevented from tilting with respect to the swing axis H.

The swing mechanism 33 is a mechanism for swinging the arm 32 and the head 31. Upon driving the swing mechanism 33, the head 31 swings around the swing axis H via the arm 32. At this time, the head 31 moves relatively with respect to the disk 50 and accesses the rotating disk 50 in close proximity.

Figure 2:
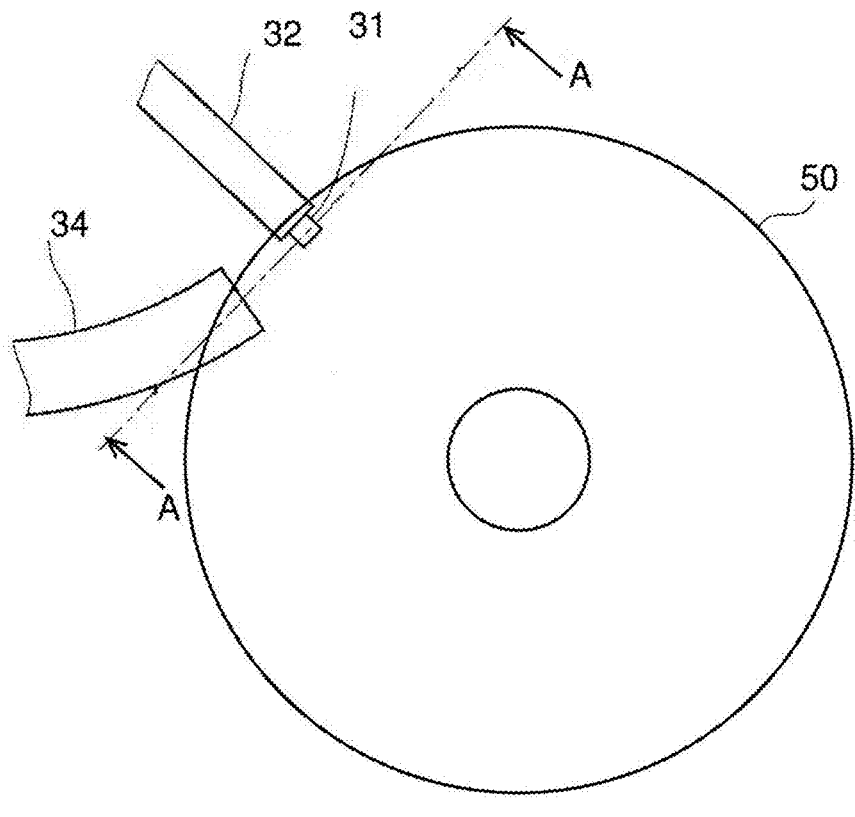
FIG. 2 is a plan view schematically illustrating a periphery of a disk of the disk drive device according to the embodiment of the present disclosure.
Figure 3:
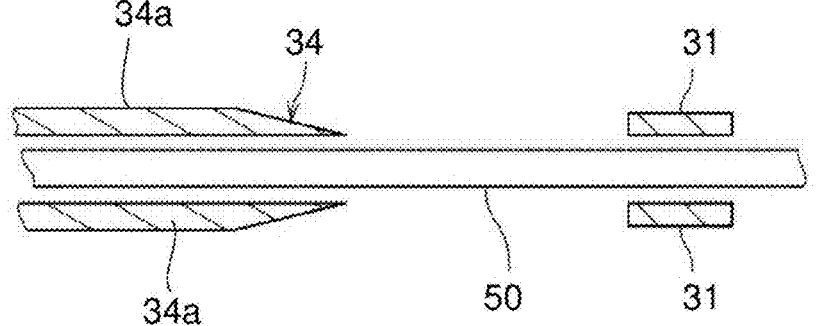
FIG. 3 is a cross-sectional view taken along line A-A in FIG. 2.

FIG. 2 is a plan view schematically illustrating a periphery of the disk 50, and FIG. 3 is a cross-sectional view taken along line A-A in FIG. 2. The ramp 34 is placed at a bottom of a second recess 418 (to be described later) of a peripheral wall 412 (see FIG. 4), and includes a plurality of guides 34*a* arranged in the axial direction. The guides 34*a* sandwich the disk 50 in the axial direction and are disposed in close proximity to the disk 50. When the access to the disk 50 is finished, the head 31 retreats from the disk 50 by the swing mechanism 33 and moves in a direction toward the ramp 34. At this time, the head 31 is held in the ramp 34 via a tip of the guide 34*a*. That is, the ramp 34 holds the head 31 which reads or writes information from and to the disk 50.

Figure 4:
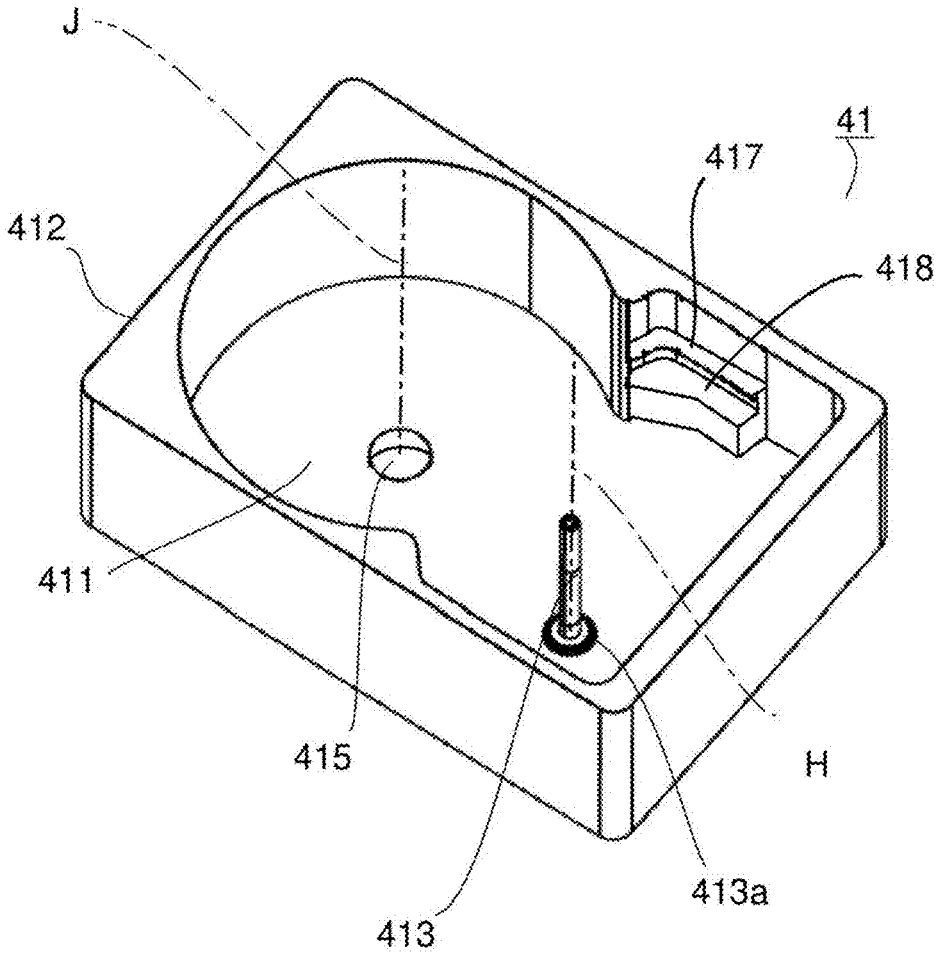
FIG. 4 is a perspective view schematically illustrating a base plate according to the embodiment of the present disclosure.
Figure 5:
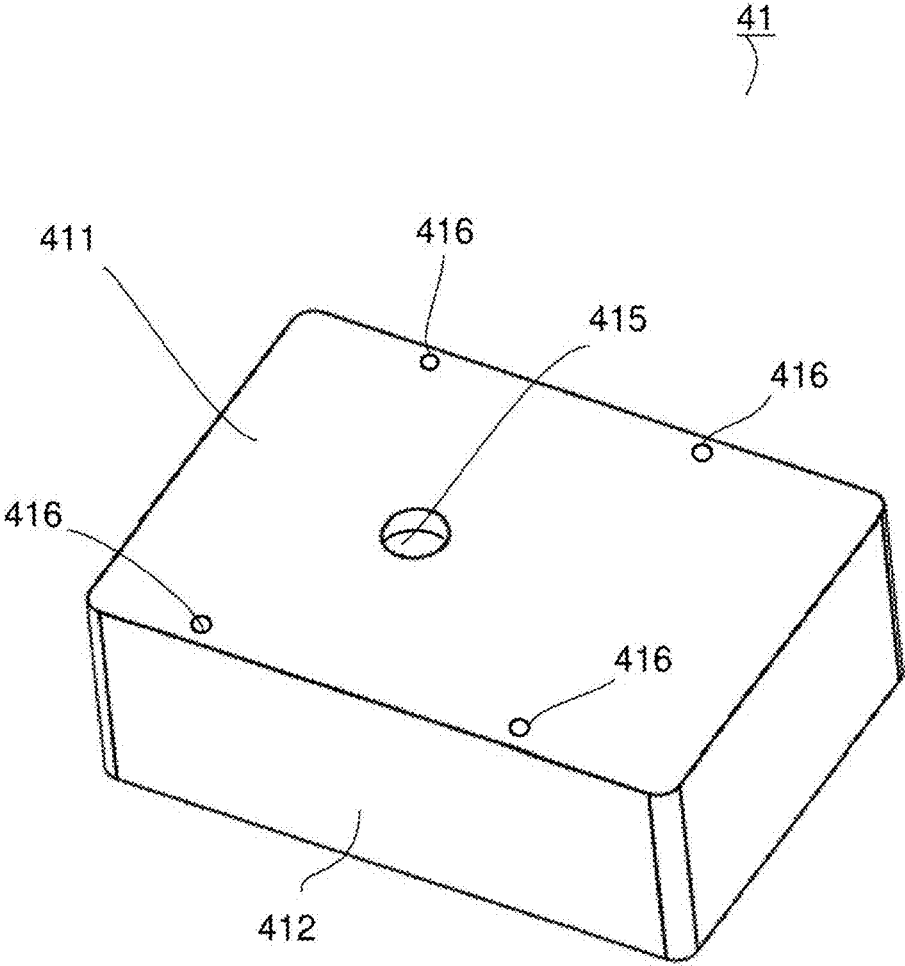
FIG. 5 is a perspective view schematically illustrating the base plate according to the embodiment of the present disclosure.

FIG. 4 and FIG. 5 are perspective views schematically illustrating the base plate 41, and FIG. 4 illustrates the base plate 41 from an axially upper side. FIG. 5 illustrates the base plate from an axially lower side. The base plate 41 includes a bottom wall 411, a peripheral wall 412, and a pivot post 413.

In the present embodiment, the bottom wall 411, the peripheral wall 412, and the pivot post 413 are an integrally defined cast product. Although the bottom wall 411 and the peripheral wall 412 are an integrally defined cast product herein, the base plate 41 may also be defined by assembling a bottom wall 411 and a peripheral wall 412 respectively cast as separate members.

The bottom wall 411 has a substantially rectangular shape when viewed from the axial direction, and extends perpendicularly to the rotation axis J and the swing axis H extending in the up-down direction. The bottom wall 411 has a shaft through hole 415 and screw holes 416. The shaft through hole 415 penetrates the bottom wall 411 in the axial direction along the rotation axis J. A lower end of the shaft 14 is press-fitted into the shaft through hole 415 and fixed to the bottom wall 411.

The screw hole 416 is recessed from a peripheral edge of a lower end surface of the bottom wall 411 to the axially upper side. A circuit board (not shown) connected to the coils 122 of the spindle motor 2 is disposed on a lower surface of the bottom wall 411. The circuit board has board through holes (not shown) penetrating in the axial direction.

Screws (not shown) are inserted into the board through holes and screwed into the screw holes 416. Accordingly, the circuit board is fixed to the bottom wall 411. Although the screw hole 416 is used for fixing the circuit board in the present embodiment, the present disclosure is not limited thereto. For example, the screw hole 416 may also be used when fixing a component other than a circuit board to the base plate. The shape of the screw hole 416 will be described in detail later.

The peripheral wall 412 extends from an outer peripheral edge of the bottom wall 411 to the axially upper side and surrounds the periphery of the bottom wall 411. The cover 42 is screw-fastened to an upper end surface of the peripheral wall 412. The peripheral wall 412 includes a first recess 417 and a second recess 418. The ramp 34 is placed at the bottom of the second recess 418. The first recess 417 and the second recess 418 will be described in detail later.

The pivot post 413 protrudes upward from the upper surface of the bottom wall 411 along the swing axis H. The swing mechanism 33 is supported by the bottom wall 411 via the pivot post 413.

Figure 6:
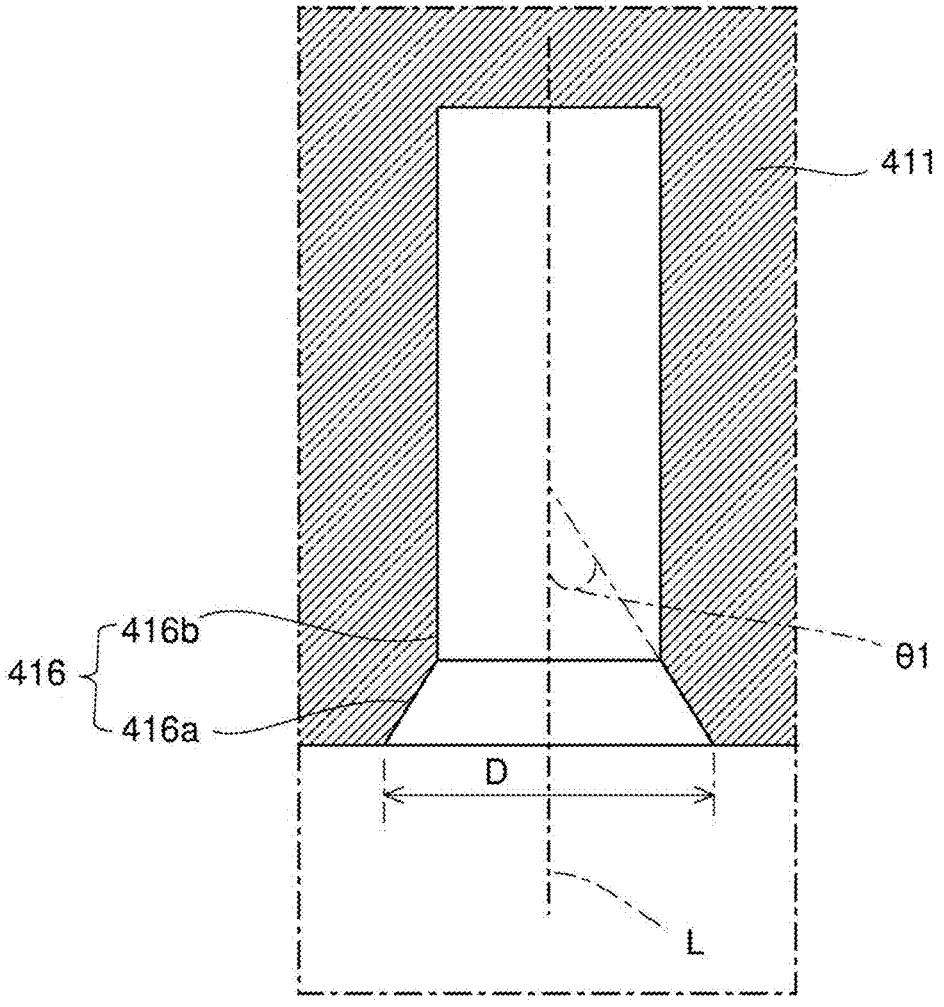
FIG. 6 is an enlarged longitudinal sectional view illustrating a screw hole of the base plate according to the embodiment of the present disclosure.
Figure 7:
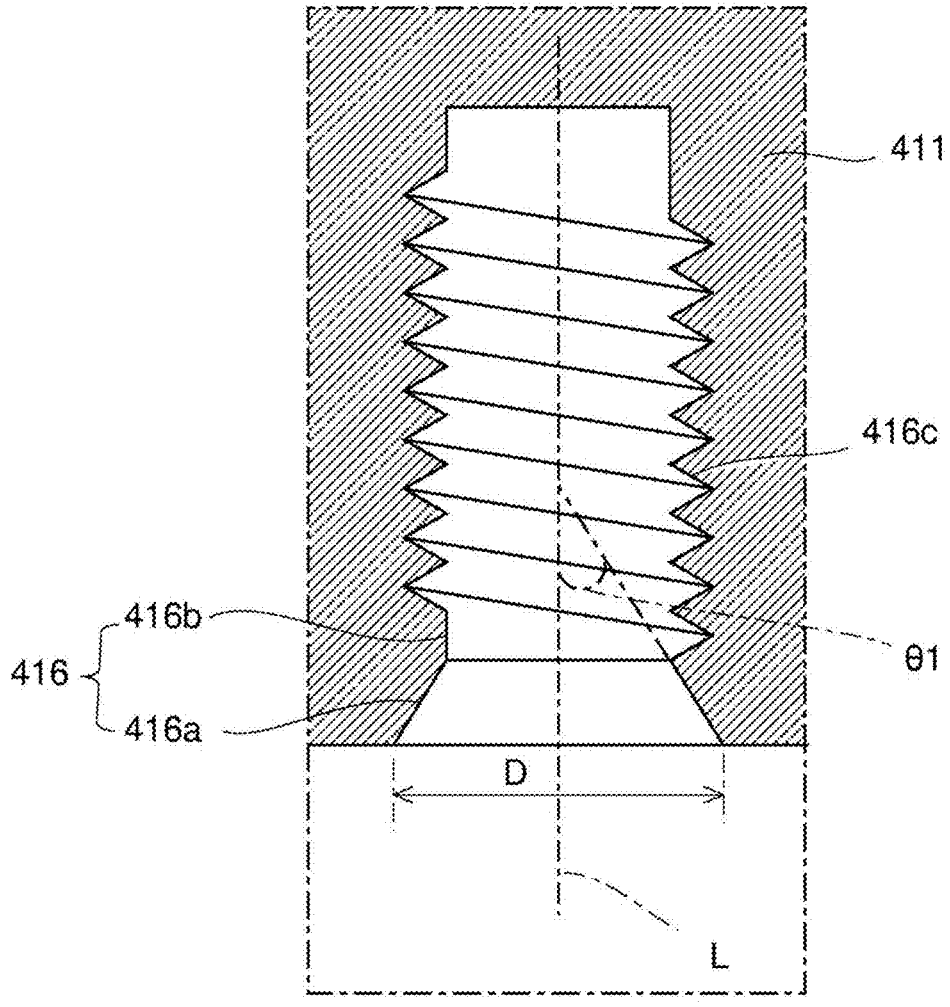
FIG. 7 is an enlarged longitudinal sectional view illustrating the screw hole of the base plate according to the embodiment of the present disclosure.
Figure 8:
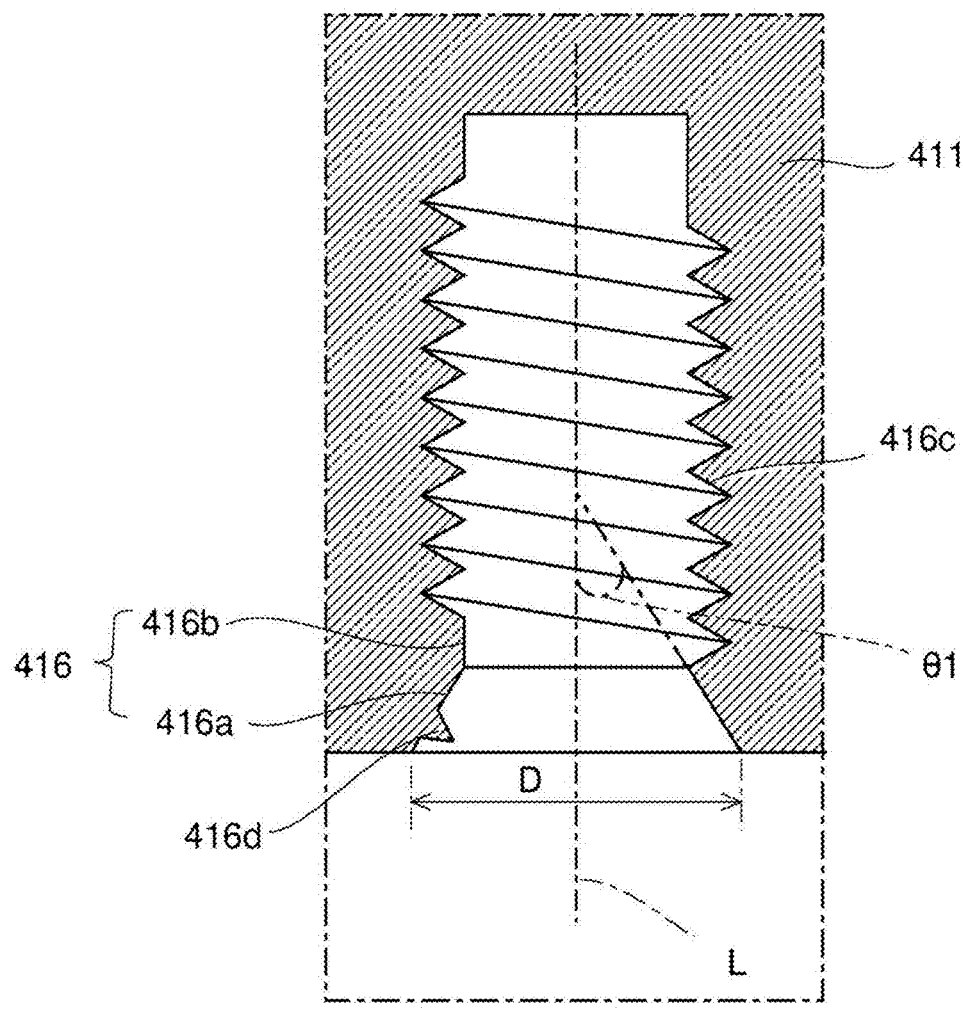
FIG. 8 is an enlarged longitudinal sectional view illustrating the screw hole of the base plate according to the embodiment of the present disclosure.

FIG. 6, FIG. 7, and FIG. 8 are enlarged longitudinal sectional views schematically illustrating the screw hole

416. FIG. 6 illustrates a state before tapping. FIG. 7 and FIG. 8 illustrate states after tapping. The screw hole 416 includes an inclined part 416*a* and a column body 416*b*. The inclined part 416*a* has a substantially truncated cone shape and is defined to have an inner diameter that decreases from a lower end toward the axially upper side. The column body 416*b* has a substantially cylindrical shape, extends from an upper end of the inclined part 416*a* to the axially upper side, and is defined with a threaded part 416*c* to be screwed with a screw (not shown). The threaded part 416*c* is a female screw defined by tapping (rolling) the screw hole 416.

In the present embodiment, in a cross section including a center line L extending in the axial direction through a center of the column body 416*b*, the inclined part 416*a* is inclined at an inclination angle $\theta 1$ of, for example, 25° or more and 35° or less with respect to the center line L. Upon keeping a diameter D at a lower end of the inclined part 416*a* constant and setting the inclination angle $\theta 1$ of the inclined part 416*a* to be small, a stress applied to a periphery of the lower end of the inclined part 416*a* is able to be reduced during tapping. Accordingly, generation of a burr 416*d* due to a partial raise at the periphery of the lower end of the inclined part 416*a* is able to be suppressed. Hence, when the base plate 41 is placed on a work table, contact between a burr 416*d* and the work table and thus rattling of the base plate 41 are able to be prevented. Accordingly, a decrease in assembly precision of components mounted on the base plate 41 is able to be prevented.

In the case where a length of the screw hole 416 in the axial direction is determined, if the diameter D at the lower end of the inclined part 416*a* is kept constant and the inclination angle $\theta 1$ of the inclined part 416*a* is set to be small, a ratio of the inclined part 416*a* in the axial direction to the whole screw hole 416 increases. As a result, a ratio of the column body 416*b*, at which the threaded part 416*c* is defined, in the axial direction is reduced. Thus, a fastening strength of the screw is reduced. In the present embodiment, by setting the inclination angle $\theta 1$ of the inclined part 416*a* to be 25° or more, for example, a decrease in the fastening strength of the screw is able to be suppressed.

In the case where a burr 416*d* is generated at the inclined part 416*a*, if the diameter D at the lower end of the inclined part 416*a* is kept constant and the inclination angle $\theta 1$ of the inclined part 416*a* is set to be large, the burr 416*d* is inclined toward the axially lower side (see FIG. 8). Thus, by setting the inclination angle $\theta 1$ of the inclined part 416*a* to be 35° or less, for example, with respect to the center line L, a tip of the burr 416*d* is able to be prevented from protruding to the axially lower side of the lower end of the bottom wall 411. Accordingly, even if the burr 416*d* is generated at the inclined part 416*a*, a decrease in assembly precision of components mounted on the base plate 41 is able to be prevented. Further, even in the case where a rolling tool contacts the inclined part 416*a* to define the threaded part 416*c* on the inclined part 416*a*, by keeping the diameter D at the lower end of the inclined part 416*a* to be constant and setting the inclination angle $\theta 1$ of the inclined part 416*a* to be 35° or less, for example, with respect to the center line L, the lower end of the threaded part 416*c* is able to be prevented from protruding from the inclined part 416*a* to become a burr and protruding to the axially lower side compared to the lower end of the bottom wall 411.

The diameter D at the lower end of the inclined part 416*a* is preferably 4.0 mm or more and 4.6 mm or less, for example. In the case where the length of the screw hole 416 in the axial direction is determined, if the inclination angle $\theta 1$ is kept constant and the diameter D at the lower end of the inclined part is set to be large, a ratio of the inclined part 416a in the axial direction in the whole screw hole 416 increases. As a result, a ratio of the column body 416b, at which the threaded part 416c is defined, in the axial direction decreases. Accordingly, the range occupied by the threaded part 416c in the axial direction decreases, and the fastening strength of the screw decreases. In the present embodiment, by setting the diameter D at the lower end of the inclined part 416a to be 4.6 mm or less, for example, a decrease in the fastening strength of the screw is able to be suppressed.

In the case where the diameter D at the lower end of the inclined part 416a is larger than 4.6 mm, for example, a region overlapping with a screw head in the axial direction on the lower end surface of the bottom wall 411 becomes narrow, and it becomes difficult to stably screw-fasten the component screw-fastened to the screw hole 416.

In the case where the diameter D at the lower end of the inclined part 416a is larger than 4.6 mm, for example, a distance between the peripheral edge of the bottom wall 411 and the screw hole 416 becomes narrow, and the peripheral edge of the bottom wall 411 is likely to deform or chipping is likely to occur.

In the case where the axial length of the screw hole 416 is determined, if the inclination angle θ1 is set to be constant and the diameter D at the lower end of the inclined part is set to be small, a stress applied to the periphery of the lower end of the inclined part 416a increases during tapping. In the present embodiment, by setting the diameter D at the lower end of the inclined part 416a to be 4.0 mm or more, for example, generation of a burr 416d at the inclined part 416a is able to be suppressed.

The burr 416d generated at the inclined part 416a preferably protrudes in the radial direction, and a lower end of the burr 416d is preferably located on the axially upper side compared to the lower end of the bottom wall 411 (see FIG. 8). Thus, even if the burr 416d is generated at the inclined part 416a, a decrease in assembly precision of components mounted on the base plate 41 is able to be prevented.

Figure 9:
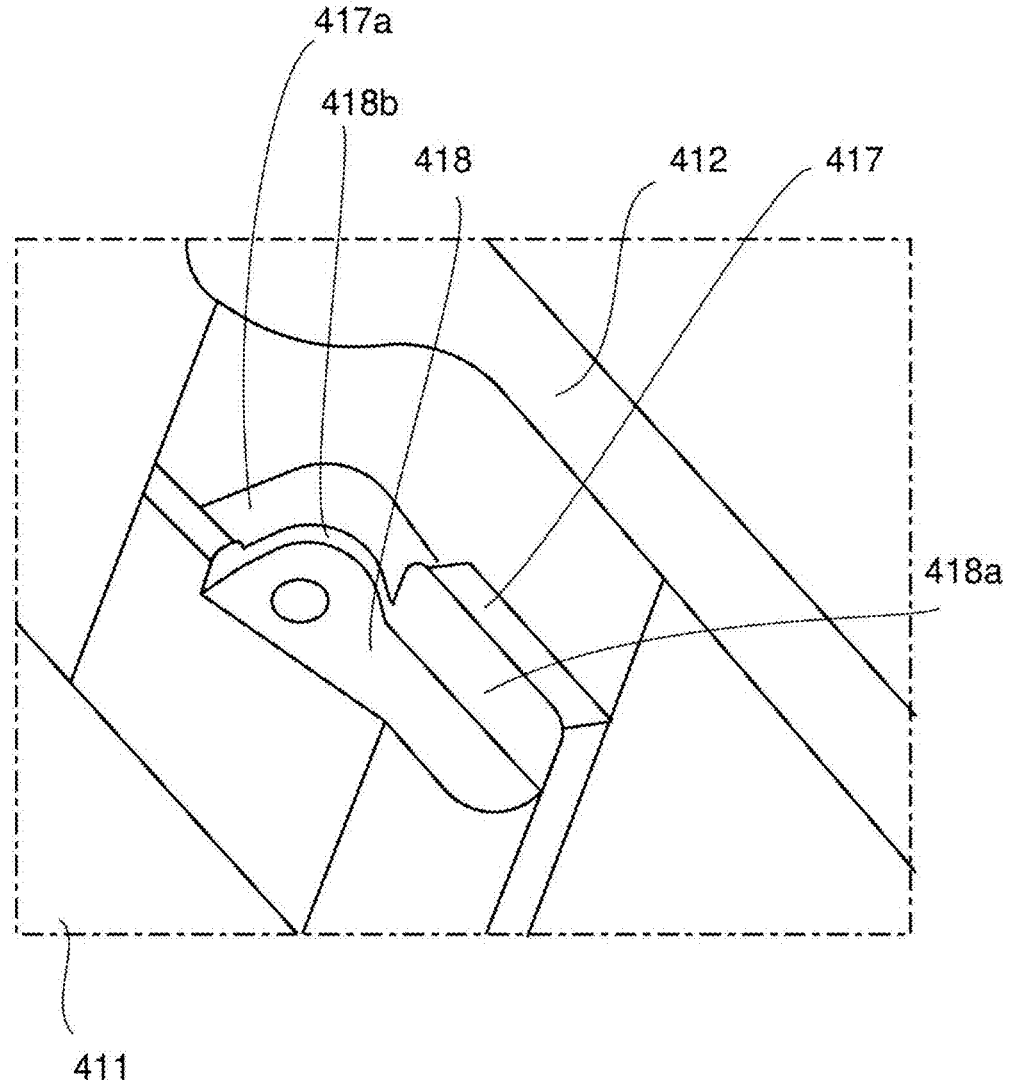
FIG. 9 is an enlarged perspective view illustrating a portion of the base plate according to the embodiment of the present disclosure.
Figure 10:
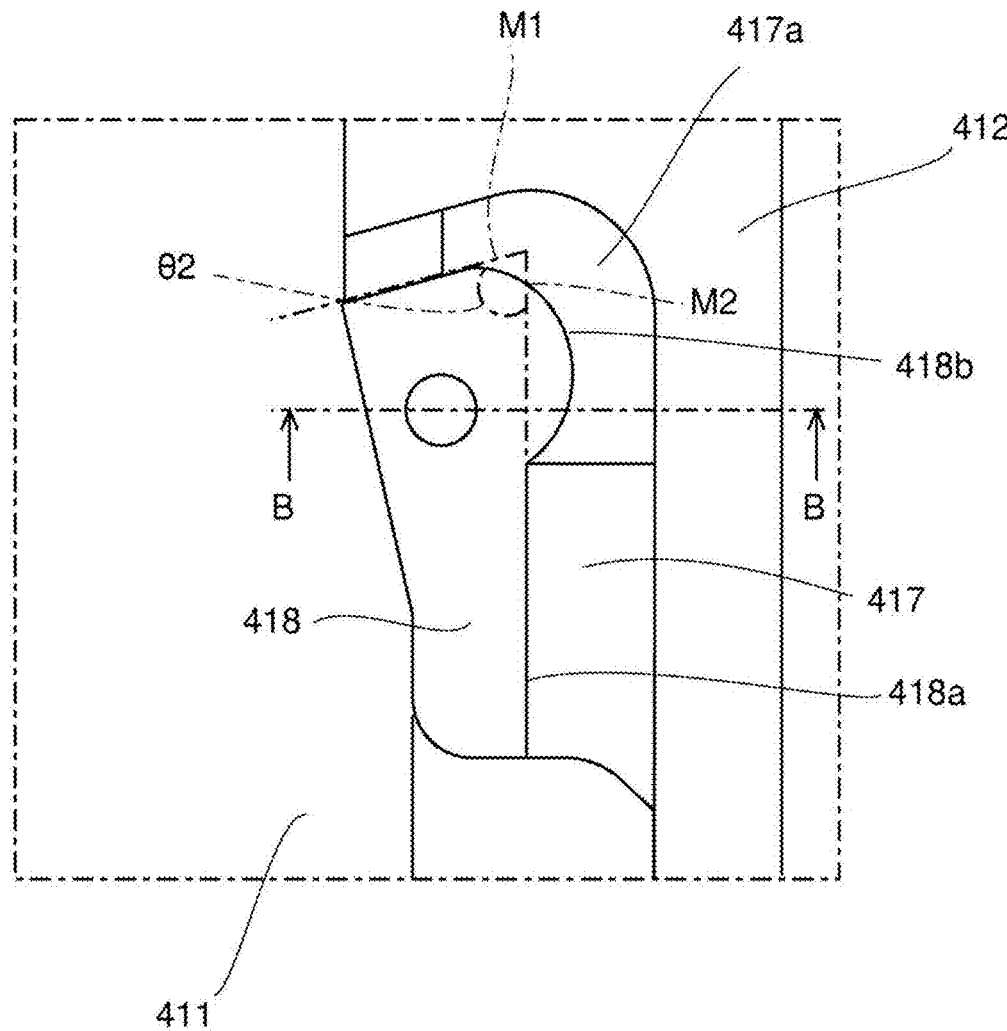
FIG. 10 is an enlarged top view illustrating a portion of the base plate according to the embodiment of the present disclosure.
Figure 11:
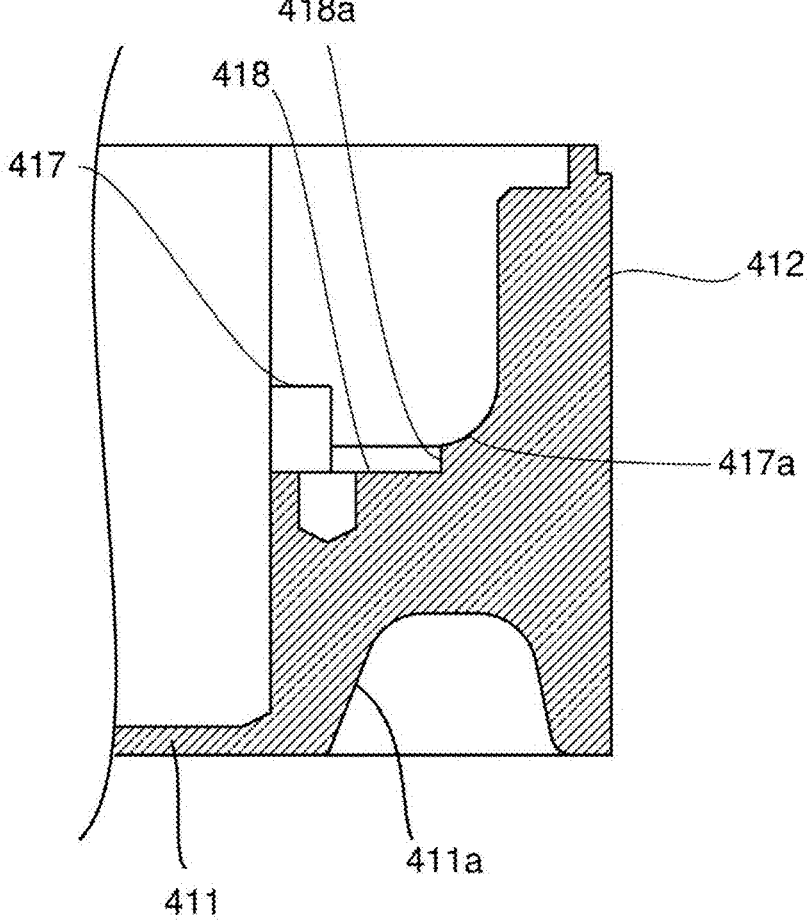
FIG. 11 is a cross-sectional view taken along line B-B in FIG. 10.

FIG. 9 is an enlarged perspective view illustrating a periphery of the second recess 418 of the base plate 41, and FIG. 10 is an enlarged top view illustrating the periphery of the second recess 418 of the base plate 41. FIG. 11 is a cross-sectional view taken along line B-B in FIG. 10. The first recess 417 is defined by recessing an inner peripheral edge of the upper end surface of the peripheral wall 412 to the axially lower side. The second recess 418 is defined by recessing an inner peripheral edge of a bottom surface of the first recess 417 further to the axially lower side, and the ramp 34 is placed thereon. An entire bottom of the first recess 417 is located on the axially upper side compared to a bottom of the second recess 418.

By defining the first recess 417, the peripheral wall 412 is thinned in the radial direction in the periphery of the second recess 418 in which the ramp 34 is placed. A shrinkage cavity is generated when molten metal is cooled, hardens, and shrinks during casting. By thinning the peripheral wall 412 in the radial direction, a hardening time of the peripheral wall 412 is shortened, and generation of a shrinkage cavity is able to be reduced. Accordingly, generation of a shrinkage cavity at the peripheral wall 412 is able to be reduced in the periphery of the second recess 418. Thus, a decrease in dimensional precision of the base plate 41 is able to be suppressed in the periphery of the second recess 418. Accordingly, positional precision of the ramp 34 is able to be improved.

The entire bottom of the first recess 417 is located on the axially upper side compared to the bottom of the second recess 418. As a result, a portion (first protrusion 2013) of a mold 201 defining the first recess 417 does not protrude to the axially lower side compared to the bottom of the second recess 418 (see FIG. 14). Thus, a projection is not defined at a portion (first protrusion 2013) of the mold 201 during casting. Accordingly, melting loss of the projection is able to be prevented. In the case where a portion (first protrusion 2013) of the mold 201 defining the first recess 417 protrudes to the axially lower side compared to the bottom of the second recess 418 and a projection is defined, melting loss may occur at the projection due to an increase in a mold temperature of the projection during casting. Thus, by defining a shape in which a projection is not provided at a portion (first protrusion 2013) of the mold 201, occurrence of melting loss is able to be prevented. Thus, generation of a burr at the bottom of the first recess 417 is able to be prevented. Accordingly, generation of a burr around the bottom of the second recess 418 is able to be prevented to further improve positional precision of the ramp 34.

A radially inner surface of the second recess 418 includes a planar surface 418a and a curved surface 418b. The planar surface 418a is defined parallel to a radially outer surface of the peripheral wall 412. The curved surface 418b is defined to be curved and recessed to the radially outer side compared to the planar surface 418a. A radially outer end of the curved surface 418b is located on the radially outer side compared to a radially outer end of the planar surface 418a. By defining the curved surface 418b, the bottom of the second recess 418 expands to the radially outer side, and the ramp 34 is able to be stably disposed at the bottom of the second recess 418. Accordingly, positional precision of the ramp 34 is able to be further improved.

The first recess 417 has a curved surface recess 417a. The curved surface recess 417a is defined by recessing a bottom surface, which is continuous with the curved surface 418b, to the axially lower side. By defining the curved surface recess 417a, the first recess 417 is able to be thinned in the axial direction to suppress generation of a shrinkage cavity. Accordingly, a decrease in dimensional precision of the base plate 41 is able to be further suppressed in the periphery of the second recess 418.

On the axially lower side of the first recess 417, the bottom wall 411 has a bottom wall recess 411a that is recessed from the lower end surface to the axially upper side. By disposing the bottom wall recess 411a on the axially lower side of the first recess 417, the bottom wall 411 is able to be thinned in the axial direction to suppress generation of a shrinkage cavity. Accordingly, a decrease in sealing property of the housing 40 and a decrease in dimensional precision of the base plate 41 are able to be further suppressed.

In a cross section orthogonal to the swing axis H, an inclination angle θ2 between a straight line M1 extending in the radial direction from the swing axis H to contact an end of the second recess 418 on the disk 50 side and a straight line M2 extending along the planar surface 418a is preferably 75° or more and 85° or less, for example. At this time, by setting the inclination angle θ2 to be 75° or more and 85° or less, for example, the guide 34a is able to be disposed in close proximity to the disk 50. Thus, when the head 31 moves between an access position and a retreat position with respect to the disk 50, the head 31 is held by the ramp 34 at a shorter distance. Accordingly, a time for the head 31 to access the disk 50 is able to be shortened.

Figure 12:
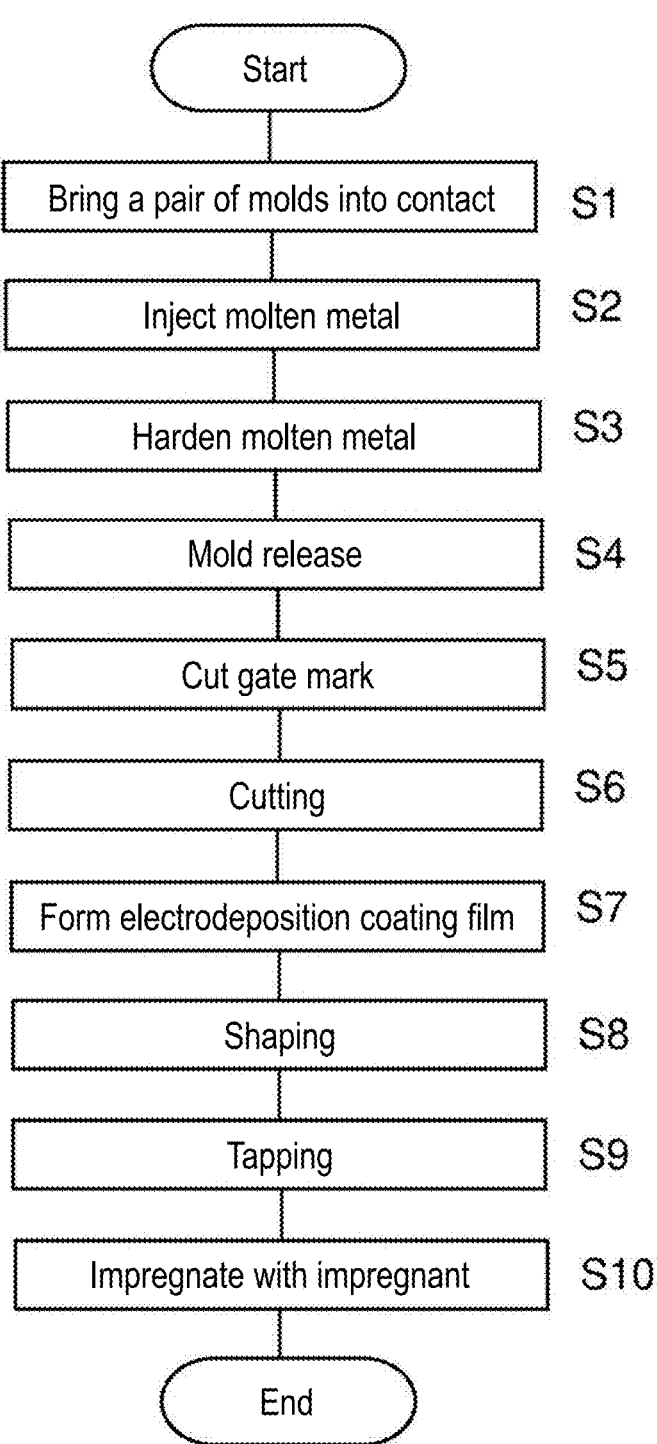
FIG. 12 is a flowchart illustrating a manufacturing process of the base plate according to the embodiment of the present disclosure.

FIG. 12 is a flowchart illustrating a manufacturing process of the base plate 41. FIG. 13 to FIG. 20 are views illustrating the manufacturing process of the base plate 41. FIG. 14 is an enlarged view illustrating the periphery of the first protrusion 2013 at which the first recess 417 of the peripheral wall 412 is defined. FIG. 20 is an enlarged view illustrating the pivot post 413.

Figure 13:
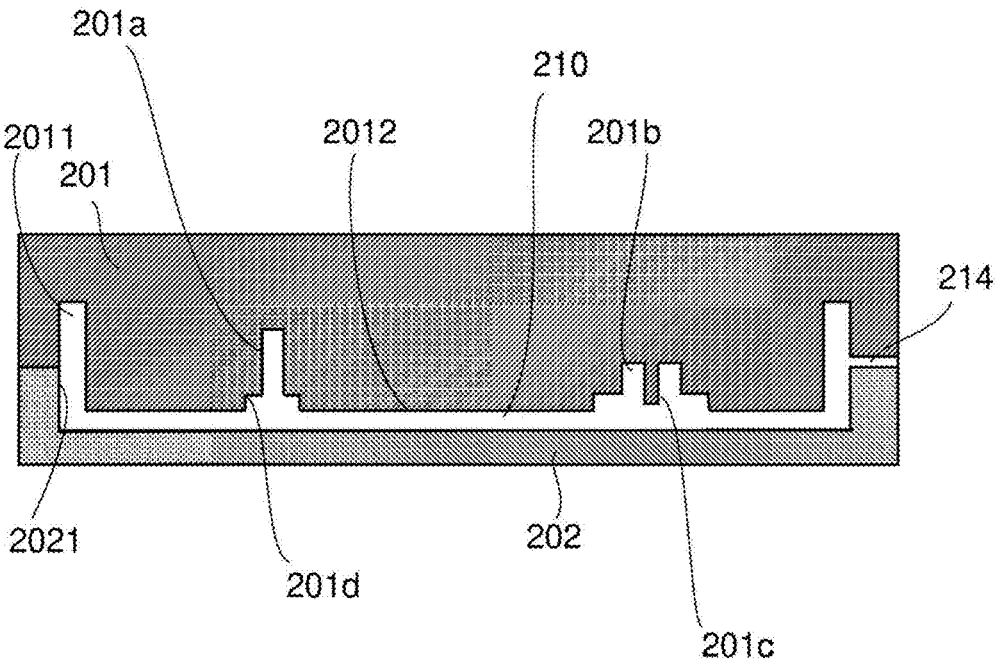
FIG. 13 is a view illustrating the manufacturing process of the base plate according to the embodiment of the present disclosure.
Figure 14:
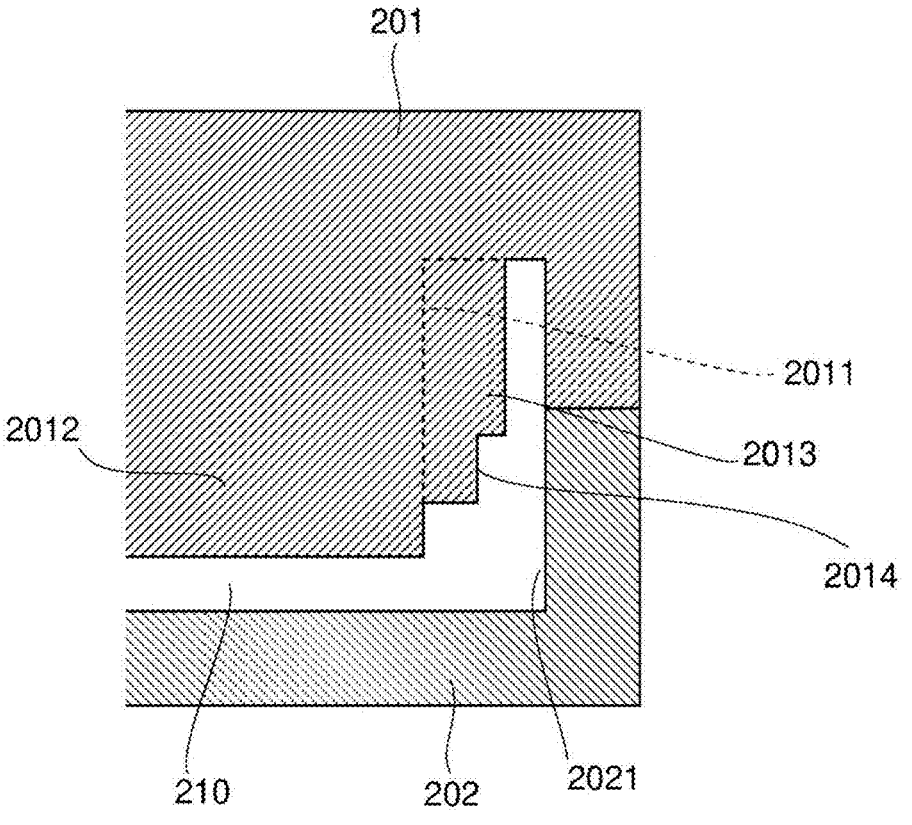
FIG. 14 is a view illustrating the manufacturing process of the base plate according to the embodiment of the present disclosure.

In step S1, as illustrated in FIG. 13, a peripheral edge of a mold 202 and a peripheral edge of a mold 201 are brought into contact with each other in the up-down direction to define a cavity 210 between the mold 201 and the mold 202. The cavity 210 has a shape corresponding to the shape of the base plate 41.

Specifically, the mold 201 is defined in a substantially rectangular parallelepiped shape and has a groove 2011 and a mold protrusion 2012. The groove 2011 is defined in a substantially annular shape by an outer peripheral part of a lower surface of the mold 201 recessed to the axially upper side. On the radially inner side of the groove 2011, the mold protrusion 2012 is defined by the lower surface of the mold 201 protruding to the axially lower side. A lower end of the mold protrusion 2012 is located lower than a lower end of the mold 201 on an outer side of the groove 2011. Molten metal flows into the groove 2011 to define the peripheral wall 412.

The mold 202 is defined in a substantially rectangular parallelepiped shape, and the mold 202 has a mold recess 2021. The mold recess 2021 is defined by an upper surface of the mold 202 recessed to the axially lower side in a region opposed to the mold protrusion 2012 in the up-down direction. Molten metal flows into the mold recess 2021 to define the bottom wall 411.

The cavity 210 communicates with a gate 214 extending along opposing surfaces of the mold 201 and the mold 202. An outer end of the gate 214 is opened to outside of the mold 201 and the mold 202.

An air vent passage (not shown) for venting air in the cavity 210 is provided on the opposing surfaces of the mold 201 and the mold 202 separately from the gate 214. An outer end of the air vent passage is opened to outside of the mold 201 and the mold 202.

The mold 201 has a post recess 201a and a shaft recess 201b. The post recess 201a is defined by the lower surface of the mold protrusion 2012 recessed to the axially upper side along the swing axis H. The inside of the post recess 201a communicates with the cavity 210. A diameter-enlarged part 201d is defined at a lower end of an inner circumferential surface of the post recess 201a. The diameter-enlarged part 201d has a diameter larger than an upper end of the inner circumferential surface of the post recess 201a. Molten metal flows into the post recess 201a to define the pivot post 413. Molten metal flows into the diameter-enlarged part 201d to define the post step part 413a.

The shaft recess 201b is defined by the lower surface of the mold protrusion 2012 recessed to the axially upper side along the rotation axis J. The inside of the shaft recess 201b communicates with the cavity 210. A projection 201c protruding downward is defined at a top surface of the shaft recess 201b.

Figure 16:
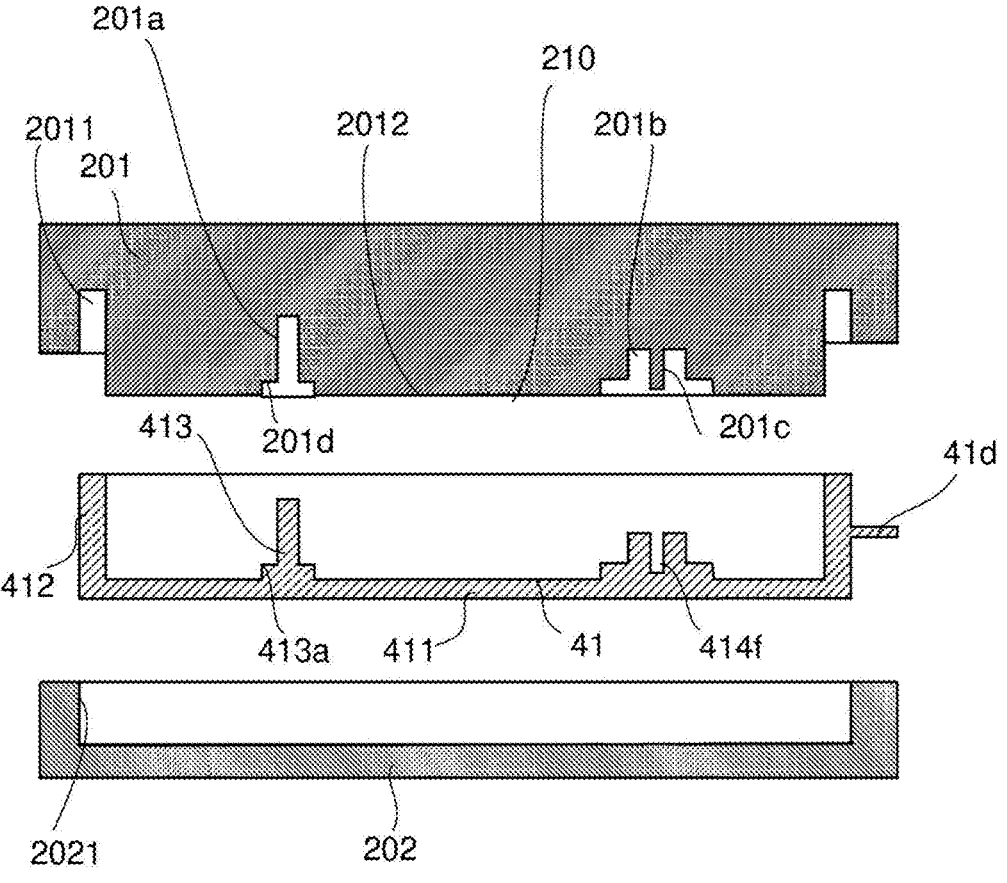
FIG. 16 is a view illustrating the manufacturing process of the base plate according to the embodiment of the present disclosure.

When molten metal flows into the shaft recess 201b, a recess 414f is defined at a position at which the projection 201c is disposed (see FIG. 16). The recess 414f is defined as recessed from the upper surface of the bottom wall 411 to the axially lower side.

The mold 201 further includes a first protrusion 2013 and a second protrusion 2014 that protrude in the radial direction from the radially outer surface of the mold protrusion 2012 (see FIG. 14). The first protrusion 2013 is defined across an inner peripheral edge of a top surface of the groove 2011 and a radially outer surface of the mold protrusion 2012. The second protrusion 2014 is defined across an inner peripheral edge of a bottom surface of the first protrusion 2013 and the radially outer surface of the mold protrusion 2012. Accordingly, a lower end of the first protrusion 2013 is located on the axially upper side compared to a lower end of the second protrusion 2014.

When molten metal flows into the cavity 210, the first recess 417 is defined at a position corresponding to the first protrusion 2013. Further, a second recess 418 is defined at a position corresponding to the second protrusion 2014.

Figure 15:
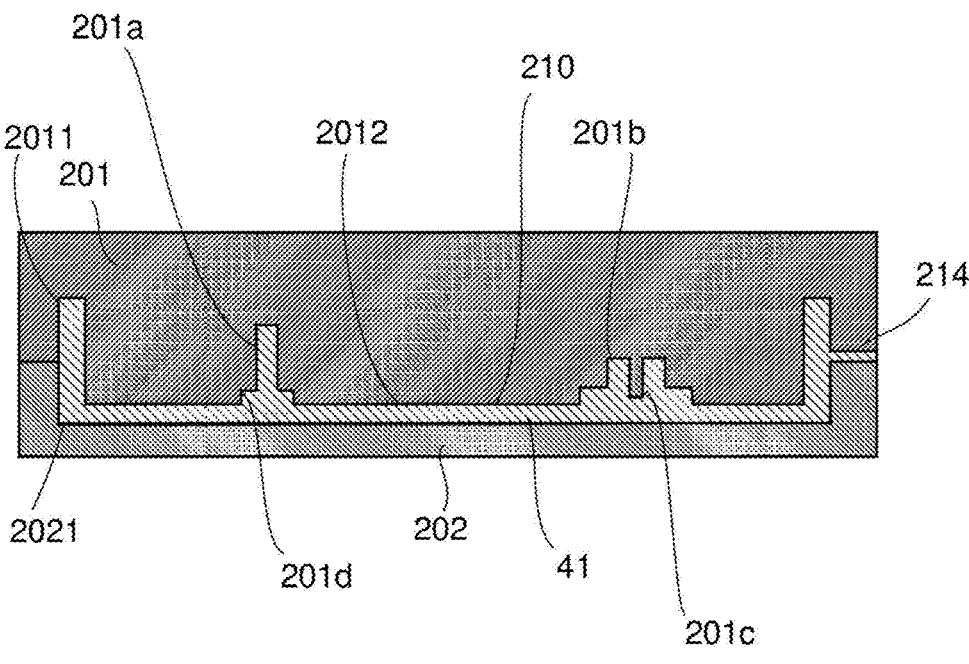
FIG. 15 is a view illustrating the manufacturing process of the base plate according to the embodiment of the present disclosure.

As illustrated in FIG. 15, in step S2, molten metal is injected into the cavity 210 via the gate 214. The molten metal is, for example, a molten aluminum alloy. Upon injection of the molten metal into the cavity 210, air in the cavity 210 or a gas generated from the molten metal is pushed out from the air vent passage to outside the mold 201 and the mold 202. As a result, the molten metal spreads throughout the cavity 210.

In step S3, after the molten metal spreads in the cavity 210, the molten metal is cooled and hardened. Accordingly, the base plate 41 is defined in the cavity 210. A chill layer (not shown) is defined on the surface of the base plate 41. When the molten metal hardens, the chill layer is defined at sites where the molten metal is contact with the mold 201 and the mold 202 and hardens quickly. The chill layer in which the molten metal hardens more quickly than the other portion has fewer impurities and a higher metal density.

As illustrated in FIG. 16, in step S4, the base plate 41 is released from the pair of molds 201 and 202. At this time, the peripheral wall 412 has a gate mark 41d protruding from the outer surface. The gate mark 41d is defined by hardened molten metal accumulated in the gate 214 and the air vent passage (not shown).

Figure 17:
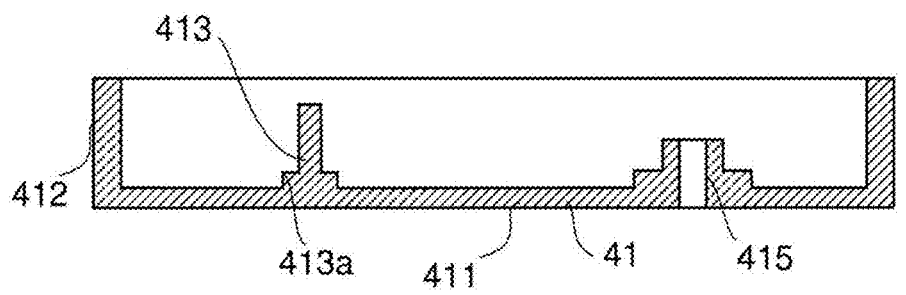
FIG. 17 is a view illustrating the manufacturing process of the base plate according to the embodiment of the present disclosure.

As illustrated in FIG. 17, in step S5, the gate mark 41d is cut off. In step S6, the base plate 41 is subjected to cutting. More specifically, the recess 414f is cut in the axial direction to penetrate the bottom wall 411 in the axial direction. Accordingly, the shaft through hole 415 is defined by cutting. Further, a mark (not shown) obtained by cutting off the gate mark 41d is left slightly protruding from the outer surface of the peripheral wall 412.

The radially inner surface of the peripheral wall 412 opposed to the disk 50 in the radial direction and the upper surface of the peripheral wall 412 are subjected to cutting.

Figure 18:
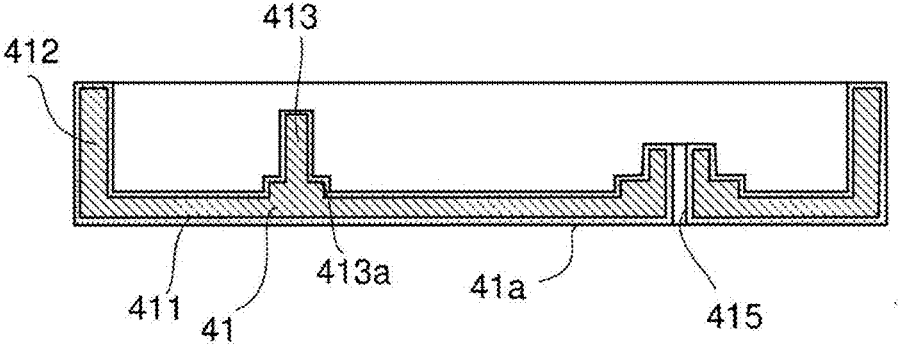
FIG. 18 is a view illustrating the manufacturing process of the base plate according to the embodiment of the present disclosure.

As illustrated in FIG. 18, in step S7, an electrodeposition coating film 41a is defined on the surface of the base plate 41. Regarding the electrodeposition coating film 41a, the base plate 41 is immersed in a coating material of an epoxy resin, for example, and a current is passed between the coating material and the base plate 41. Accordingly, the coating material adheres to the surface of the base plate 41 to define the electrodeposition coating film 41a. At this time, an outer surface of the cut surface cut in step S6 is also covered with the electrodeposition coating film 41a. By covering the base plate 41 with the electrodeposition coating film 41a, the insulating property of the base plate 41 is able to be improved, and leakage of a gas passing through the base plate 41 is able to be reduced.

Figure 19:
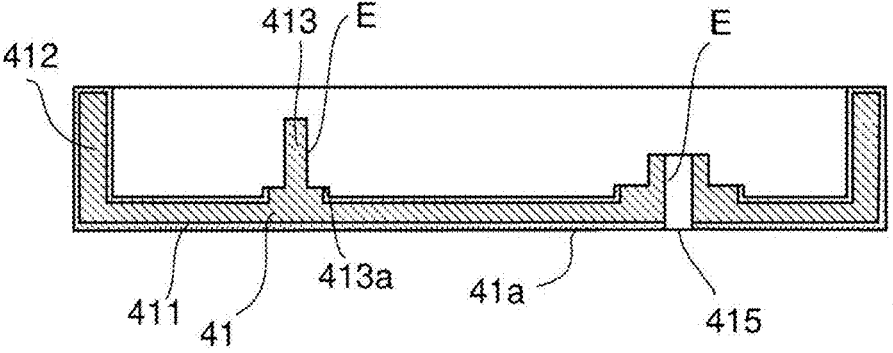
FIG. 19 is a view illustrating the manufacturing process of the base plate according to the embodiment of the present disclosure.
Figure 20:
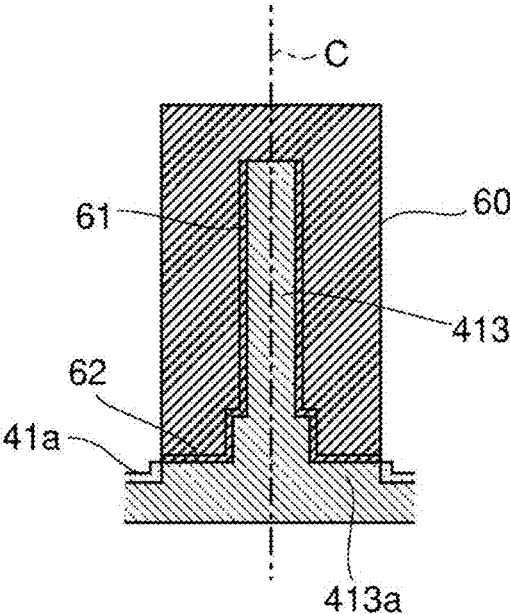
FIG. 20 is a view illustrating the manufacturing process of the base plate according to the embodiment of the present disclosure.

As illustrated in FIG. 19, in step S8, a region of the surface of the base plate 41 requiring precision is subjected to precision machining and shaping by cutting. Specifically, the outer circumferential surface of the pivot post 413, the upper surface of the post step part 413a, the inner circumferential surface of the shaft through hole 415, the periphery of the shaft through hole 415 at the upper surface of the bottom wall 411, the bottom surface of the second recess 418, the peripheral edge of the upper end surface of the peripheral wall 412, and the peripheral edge of the lower end surface of the bottom wall 411 are shaped. At this time, the periphery of the screw hole 416 and a periphery of a component screw hole (not shown) for fixing a component defined on the upper surface of the bottom wall 411 are also shaped.

By performing precision machining and shaping on the bottom surface of the second recess 418, the positional precision of the ramp 34 is able to be further improved.

By performing precision machining and shaping on the peripheral edge of the upper end surface of the peripheral wall 412, the cover 42 is able to be brought into close contact with the peripheral edge of the upper end surface of the peripheral wall 412 to improve the sealing property of the housing 40. Further, by performing precision machining and shaping on the peripheral edge of the lower end surface of the bottom wall 411, rattling of the base plate placed on the work table is able to be suppressed.

As illustrated in FIG. 20, a machining tool 60 is preferably used for performing precision machining on the outer circumferential surface of the pivot post 413 and the upper surface of the post step part 413*a*. The machining tool 60 is a cylindrical body with an opened bottom surface, and the pivot post 413 is inserted therein. The machining tool 60 includes a first cutting blade 61 disposed at an inner circumferential surface and a second cutting blade 62 disposed at a bottom surface. With the pivot post 413 inserted therein, the machining tool 60 rotates around a central axis C extending along the pivot post 413. Accordingly, the pivot post 413 is able to be machined into a perfect circle in a cross section orthogonal to the central axis C.

The upper surface of the post step part 413*a* is machined by the second cutting blade 62 to define a plane orthogonal to the central axis C. At this time, the outer circumferential surface of the pivot post 413 and the upper surface of the post step part 413*a* are able to be simultaneously machined by one machining tool 60. Accordingly, a machining time is able to be shortened. When the upper surface of the post step part 413*a* is machined by the second cutting blade 62, a machining mark (not shown) may be defined on the upper surface of the post step part 413*a*. For example, the machining mark may be a plurality of annular linear marks defined around the central axis C. Further, an annular groove (not shown) may also be defined on the upper surface of the post step part 413*a* by the second cutting blade 62.

The electrodeposition coating film 41*a* is also cut due to the cutting of the surface of the base plate 41, and a non-coated region E in which the electrodeposition coating film 41*a* is not provided is defined.

In step S9, the screw hole 416 and the component screw hole (not shown) are subjected to tapping (rolling) to define the threaded part 416*c*.

In step S10, the base plate 41 is immersed in an impregnant. As a result, the impregnant is infiltrated into the non-coated region E. At this time, the impregnant is also infiltrated into the precision-machined surface shaped in step S8. The impregnant is, for example, an epoxy resin or an acrylic resin. In this manner, in the non-coated region E, the minute cavities defined during casting are sealed with the impregnant. Thus, leakage of the gas filled inside the housing 40 to the outside is able to be further suppressed.

The manufacturing method of the base plate 41 as a cast product which is a portion of the housing 40 of the disk drive device 1 sequentially includes a casting process, a cutting process, an electrodeposition coating process, a shaping process, a tapping process, and an impregnation process. In the casting process, the bottom wall 411 and the peripheral wall 412 are cast integrally by the molds (steps S1 to S4). In the cutting process, the shaft through hole 415 is defined by cutting (step S6). In the electrodeposition coating process, the electrodeposition coating film 41*a* is defined on the surface of the base plate 41 (step S7). In the shaping process, a region of the surface of the base plate 41 requiring precision is subjected to precision machining and shaping by cutting (step S8). In the tapping process, the screw hole 416 is tapped to define the threaded part 416*c* (step S9). In the impregnation process, a region exposed from the electrodeposition coating film 41*a* on the surface of the base plate 41 is impregnated with an impregnant (step S10).

Figure 21:
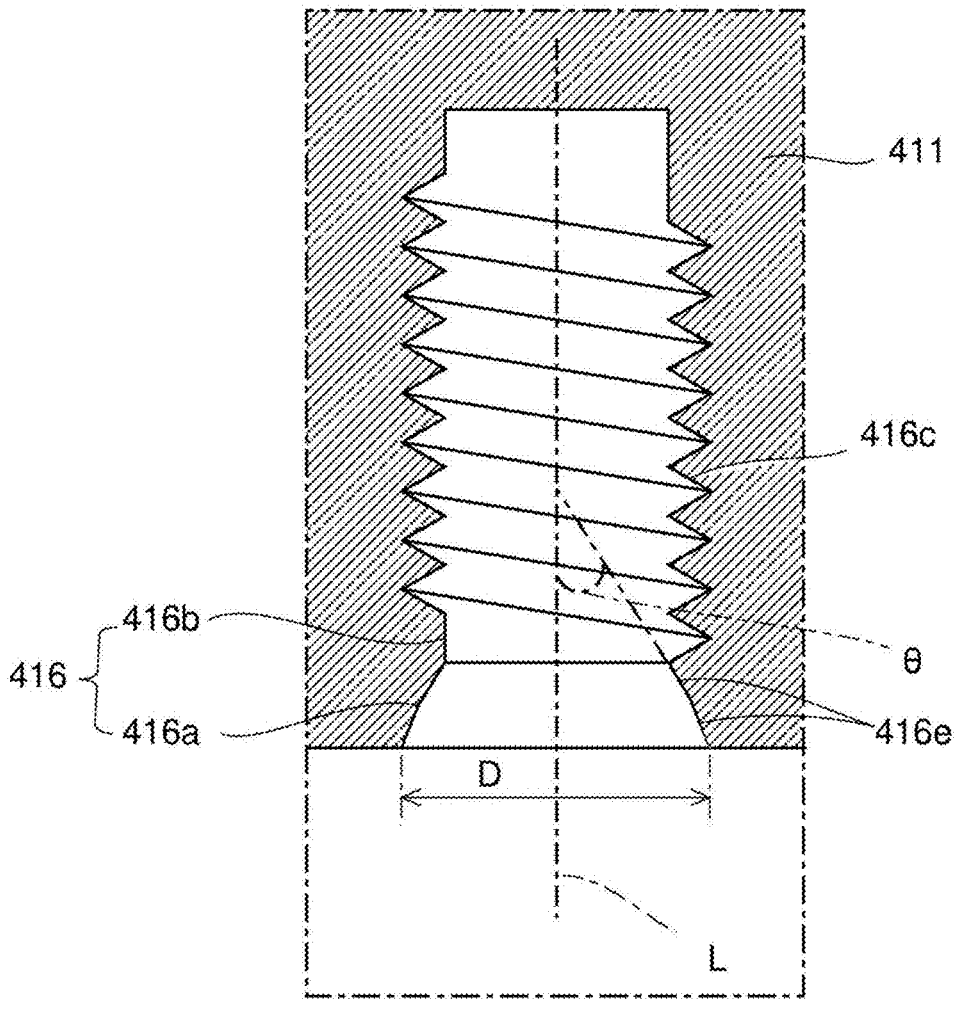
FIG. 21 is an enlarged longitudinal sectional view illustrating a screw hole according to a modification example of the base plate according to the embodiment of the present disclosure.

The above embodiments are merely examples of the present disclosure. For example, FIG. 21 is an enlarged longitudinal sectional view illustrating a screw hole 416 according to a modification example, in which an inclined part 416*a* may also be defined such that a plurality of inclined surfaces 416*e* having different inclination angles θ1 with respect to the center line L are arranged in the axial direction. Thus, a stress applied to the periphery of the lower end of the inclined part 416*a* is able to be reduced when tapping is performed. Accordingly, generation of a burr 416*d* due to a partial raise at the periphery of the lower end of the inclined part 416*a* is able to be suppressed.

As described above, a base plate (41) according to an aspect of the present disclosure is a portion of a housing (40) of a disk drive device (1) and is defined by a die-cast member including metal. The base plate includes a bottom wall (411) and a peripheral wall (412). The bottom wall (411) extends perpendicularly to a rotation axis (C) of a disk extending in an up-down direction. The peripheral wall (412) extends from a peripheral edge of the bottom wall to an axially upper side and surrounds a periphery of the bottom wall. The bottom wall includes a screw hole (416) recessed from a peripheral edge of a lower end surface to the axially upper side. The screw hole includes an inclined part (416*a*) and a column body (416*b*). The inclined part (416*a*) is defined to have an inner diameter that decreases from a lower end toward the axially upper side. The column body (416*b*) extends from an upper end of the inclined part to the axially upper side and is defined with a threaded part (416*c*) to be screwed with a screw. In a cross section comprising a center line that passes through a center of the column body and extends in an axial direction, the inclined part is inclined at an inclination angle of 25° or more and 35° or less with respect to the center line (first configuration).

In the first configuration, a diameter at the lower end of the inclined part may be 4.0 mm or more and 4.6 mm or less (second configuration).

In the first or second configuration, a lower end of a burr (416*d*) defined protruding from the inclined part may be located on the axially upper side compared to a lower end of the bottom wall (third configuration).

In any one of the first to third configurations, a burr (416*d*) defined at the inclined part may protrude in a radial direction (fourth configuration).

In any one of the first to fourth configurations, the inclined part may be defined by a plurality of inclined surfaces (416*e*) that have different inclination angles with respect to the center line and are arranged in the axial direction (fifth configuration).

In any one of the first to fifth configurations, the peripheral wall may include a first recess (417) and a second recess (418). The first recess (417) is defined by recessing an inner peripheral edge of an upper end surface to an axially lower side. The second recess (418) is defined by further recessing an inner peripheral edge of a bottom surface of the first recess to the axially lower side. A ramp (34) holding a head (31) that reads or writes information from and to the disk (50) may be placed at a bottom of the second recess. An entire bottom of the first recess may be located on the axially upper side compared to the bottom of the second recess (sixth configuration).

In the sixth configuration, a radially inner surface of the second recess may include a planar surface (418a) and a curved surface (418b). The planar surface (418a) is parallel to a radially outer surface of the peripheral wall. The curved surface (418b) is curved and recessed to a radially outer side compared to the planar surface. A radially outer end of the curved surface may be located on the radially outer side compared to a radially outer end of the planar surface (seventh configuration).

In the seventh configuration, the first recess may include a curved surface recess (417a) defined by recessing a bottom surface, which is continuous with the curved surface, to the axially lower side (eight configuration).

In any one of the sixth to eighth configurations, on the axially lower side of the first recess, the bottom wall may include a bottom wall recess recessed from the lower end surface to the axially upper side (ninth configuration).

A motor (2) according to an aspect of the present disclosure may include the base plate (41) according to any one of the first to ninth configurations (tenth configuration).

A disk drive device (1) according to an aspect of the present disclosure may include: the spindle motor (2) according to the tenth configuration; a disk (50) rotated around the rotation axis by the spindle motor; and a head (31) that reads or writes information from and to the disk (eleventh configuration).

For example, the present disclosure is applicable to a disk drive device such as a hard disk drive.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A base plate which is a portion of a housing of a disk drive device and is defined by a die-cast member comprising metal, the base plate comprising:
   a bottom wall extending perpendicularly to a rotation axis of a disk extending in an up-down direction; and
   a peripheral wall extending from a peripheral edge of the bottom wall to an axially upper side and surrounding a periphery of the bottom wall, wherein
   the bottom wall comprises a screw hole recessed from a peripheral edge of a lower end surface to the axially upper side,
   the screw hole comprises:
      an inclined part defined to have an inner diameter that decreases from a lower end toward the axially upper side; and
      a column body extending from an upper end of the inclined part to the axially upper side and defined with a threaded part to be screwed with a screw, and in a cross section comprising a center line that passes through a center of the column body and extends in an axial direction, the inclined part is inclined at an inclination angle of 25° or more and 35° or less with respect to the center line.

2. The base plate according to claim 1, wherein
a diameter at the lower end of the inclined part is 4.0 mm or more and 4.6 mm or less.

3. The base plate according to claim 1, wherein
a lower end of a burr defined protruding from the inclined part is located on the axially upper side compared to a lower end of the bottom wall.

4. The base plate according to claim 1, wherein
a burr defined at the inclined part protrudes in a radial direction.

5. The base plate according to claim 1, wherein
the inclined part is defined by a plurality of inclined surfaces that have different inclination angles with respect to the center line and are arranged in the axial direction.

6. The base plate according to claim 1, wherein
the peripheral wall comprises:
   a first recess defined by recessing an inner peripheral edge of an upper end surface to an axially lower side; and
   a second recess defined by further recessing an inner peripheral edge of a bottom surface of the first recess to the axially lower side,
a ramp holding a head that reads or writes information from and to the disk is placed at a bottom of the second recess, and
an entire bottom of the first recess is located on the axially upper side compared to the bottom of the second recess.

7. The base plate according to claim 6, wherein
a radially inner surface of the second recess comprises:
   a planar surface parallel to a radially outer surface of the peripheral wall; and
   a curved surface that is curved and recessed to a radially outer side compared to the planar surface, and
a radially outer end of the curved surface is located on the radially outer side compared to a radially outer end of the planar surface.

8. The base plate according to claim 7, wherein
the first recess comprises a curved surface recess defined by recessing a bottom surface, which is continuous with the curved surface, to the axially lower side.

9. The base plate according to claim 6, wherein
on the axially lower side of the first recess, the bottom wall comprises a bottom wall recess recessed from the lower end surface to the axially upper side.

10. A motor comprising:
the base plate according to claim 1.

11. A disk drive device comprising:
the motor according to claim 10;
a disk rotated around the rotation axis by the motor; and
a head that reads or writes information from and to the disk.

* * * * *